United States Patent
Thorne

(10) Patent No.: US 9,146,903 B2
(45) Date of Patent: Sep. 29, 2015

(54) METHOD OF USING SPATIALLY INDEPENDENT SUBSETS OF DATA TO CALCULATE VERTICAL TREND CURVE UNCERTAINTY OF SPATIALLY CORRELATED RESERVOIR DATA

(75) Inventor: Julian Thorne, Orange, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 983 days.

(21) Appl. No.: 13/297,070

(22) Filed: Nov. 15, 2011

(65) Prior Publication Data

US 2013/0124092 A1    May 16, 2013

(51) Int. Cl.
E21B 49/00 (2006.01)
G01V 99/00 (2009.01)
G06F 17/40 (2006.01)
G06F 19/00 (2011.01)
(Continued)

(52) U.S. Cl.
CPC ............. *G06F 17/18* (2013.01); *E21B 49/00* (2013.01); *G01V 11/00* (2013.01); *G01V 99/00* (2013.01); *G06K 9/6256* (2013.01); *G06F 17/40* (2013.01); *G06F 19/00* (2013.01)

(58) Field of Classification Search
CPC ......... E21B 41/00; E21B 47/00; E21B 49/00; G01D 1/00; G01D 7/00; G01D 9/00; G01D 21/00; G01V 1/00; G01V 1/28; G01V 1/30; G01V 1/306; G01V 1/40; G01V 9/00; G01V 99/00; G01V 99/005; G06F 11/00; G06F 11/30; G06F 11/32; G06F 11/34; G06F 15/00; G06F 15/16; G06F 17/00; G06F 17/10; G06F 17/16; G06F 17/18; G06F 17/40; G06F 19/00

USPC ........ 73/152.01, 152.02, 432.1, 865.8, 865.9, 73/866.3; 166/244.1, 250.01; 175/40, 50; 181/101; 250/253; 324/323; 367/14; 702/1, 2, 6, 11, 12, 13, 127, 182, 187, 702/189; 708/100, 105, 200

See application file for complete search history.

(56) References Cited

U.S. PATENT DOCUMENTS 7,389,201 B2 * 6/2008 Chickering et al. .......... 702/181
8,214,157 B2 * 7/2012 Moser et al. ................... 702/19
(Continued)

OTHER PUBLICATIONS

International Search Report, issued on Feb. 13, 2013 during the prosecution of International Application No. PCT/US2012/048103.
(Continued)

*Primary Examiner* — Edward Cosimano
(74) *Attorney, Agent, or Firm* — Albert K. Shung

(57) ABSTRACT

A method, implemented on a computer, for calculating vertical trend curve uncertainty of spatially correlated reservoir data. The method includes inputting, into the computer, a sample reservoir data comprising correlated data; applying, using the computer, a variogram to the sample reservoir data to select a plurality of subsets of data, the subsets of data being substantially less correlated than the sample reservoir data; and applying, using the computer, a bootstrap process on each of the plurality of subsets of data to obtain a plurality of bootstrap data sets from each of the plurality of subsets of data. The method further includes calculating vertical trend curves for each of the obtained plurality of bootstrap data sets, ranking the vertical trend curves by using a selected statistical parameter to obtain ranked vertical trend curves, and characterizing the uncertainty based on the ranked vertical trend curves.

25 Claims, 4 Drawing Sheets

(51) Int. Cl.
*G06F 17/18* (2006.01)
*G01V 11/00* (2006.01)
*G06K 9/62* (2006.01)

(56) References Cited

U.S. PATENT DOCUMENTS

| | | | |
|---|---|---|---|
| 2001/0004726 A1 | 6/2001 | Lambrecht | |
| 2002/0184139 A1* | 12/2002 | Chickering et al. | 705/38 |
| 2009/0307248 A1* | 12/2009 | Moser et al. | 707/101 |
| 2010/0174517 A1 | 7/2010 | Slupphaug et al. | |
| 2010/0299126 A1 | 11/2010 | Chugunov et al. | |
| 2011/0098930 A1 | 4/2011 | Pyrcz et al. | |
| 2013/0124097 A1* | 5/2013 | Thorne | 702/11 |
| 2013/0124522 A1* | 5/2013 | Moser et al. | 707/737 |
| 2013/0317779 A1* | 11/2013 | Thorne | 702/180 |
| 2014/0040265 A1* | 2/2014 | Moser et al. | 707/737 |

OTHER PUBLICATIONS

Written Opinion of the International Searching Authority, issued on Feb. 12, 2013 during the prosecution of International Application No. PCT/US2012/048103.

Spatial bootstrap methods of Journal (A.G. Journal, "Resampling from stochastic simulations," Environmental and Ecological Statistics, 1994, p. 63-91.

Xu, Wenlong and Journel, Andre G., Histogram and Scattergram Smoothing Using Convex Quadratic Programming, International Association for Mathematical Geology, 1995, p. 83-103.

* cited by examiner

METHOD OF USING SPATIALLY INDEPENDENT SUBSETS OF DATA TO CALCULATE VERTICAL TREND CURVE UNCERTAINTY OF SPATIALLY CORRELATED RESERVOIR DATA

CROSS REFERENCE TO RELATED APPLICATIONS

The present invention is related to pending U.S. patent application Ser. No. 13/678,218 entitled "SYSTEM AND METHOD OF USING SPATIALLY INDEPENDENT SUBSETS OF DATA TO DETERMINE THE UNCERTAINTY OF SOFT-DATA DEBIASING OF PROPERTY DISTRIBUTIONS FOR SPATIALLY CORRELATED RESERVOIR DATA" and pending U.S. patent application Ser. No. 13/297,092 entitled "SYSTEM AND METHOD OF USING SPATIALLY INDEPENDENT SUBSETS OF DATA TO CALCULATE PROPERTY DISTRIBUTION UNCERTAINT OF SPATIALLY CORRELATED RESERVOIR DATA", both of which are filed concurrently with the present patent application and the entire contents of each is herein incorporated by reference.

FIELD

The present invention relates generally to statistical analysis of reservoir data or more specifically to a method of using spatially independent subsets of data to calculate vertical trend curve uncertainty of spatially correlated reservoir data.

BACKGROUND

Reservoir properties are sampled at well logs (wireline, LWD or cased-hole logs). Proper characterization of a reservoir, particularly for estimates of net rock volume, porosity volume, and original oil in place, requires an estimate of the vertical trend curves of shale volume, porosity, permeability, saturation, etc. and the uncertainty of these vertical trend curves. Vertical trend curve uncertainty is a key component of reservoir characterization that affects volumetric uncertainty and reservoir recovery forecasts. Vertical property trends, in particular, can significantly affect the amount of oil in place estimated to be above an oil-water contact, because for example, a fining-upward trend will place less reservoir rock in the upper portions of the model above the contact and, likewise, a coarsening-upward trend will place more reservoir rock above the contact. Vertical property trends, particularly trends in permeability, can also significantly affect the movement of oil, gas, steam, and water in a reservoir.

Typically a reservoir modeler will have no way to derive accurate vertical trend curve uncertainty for his model. Conventional statistical techniques of bootstrap are often used to assess the uncertainty of population statistics or property distribution (for example, as implemented in application Crystal Ball from Oracle Corp). However, conventional bootstrap methods assume incorrectly that each property data collected is an independent measurement. Spatial bootstrap methods do not assume data independence but these methods are conventionally used solely to determine the uncertainty of the mean of some property distribution. These methods are not used to determine the vertical trend curve uncertainty.

Therefore, there is a need for a method of determining uncertainty of a vertical trend curve such as, but not limited to, vertical trend curves of shale volume, porosity, permeability, saturation, etc.

SUMMARY

In accordance with some aspects of the disclosure, a method, implemented on a computer, for calculating vertical trend curve uncertainty of spatially correlated reservoir data. The method includes inputting, into the computer, a sample reservoir data comprising correlated data; applying, using the computer, a variogram to the sample reservoir data to select a plurality of subsets of data, the subsets of data being substantially less correlated than the sample reservoir data; applying, using the computer, a bootstrap process on each of the plurality of subsets of data to obtain a plurality of bootstrap data sets from each of the plurality of subsets of data; calculating vertical trend curves for each of the obtained plurality of bootstrap data sets; ranking the vertical trend curves by using a selected statistic to obtain ranked vertical trend curves; calculating a statistical parameter of the ranked vertical trend curves; and determining the uncertainty in the ranked vertical trend curves based on the calculated statistical parameter.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various Figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

According to an aspect of the present disclosure, it is provided a method of estimating vertical trend curve uncertainty, that is, the uncertainty associated with vertical trend curves of reservoir properties such as shale volume, porosity, saturation etc. . . . in a reservoir volume of interest.

Figure 1:
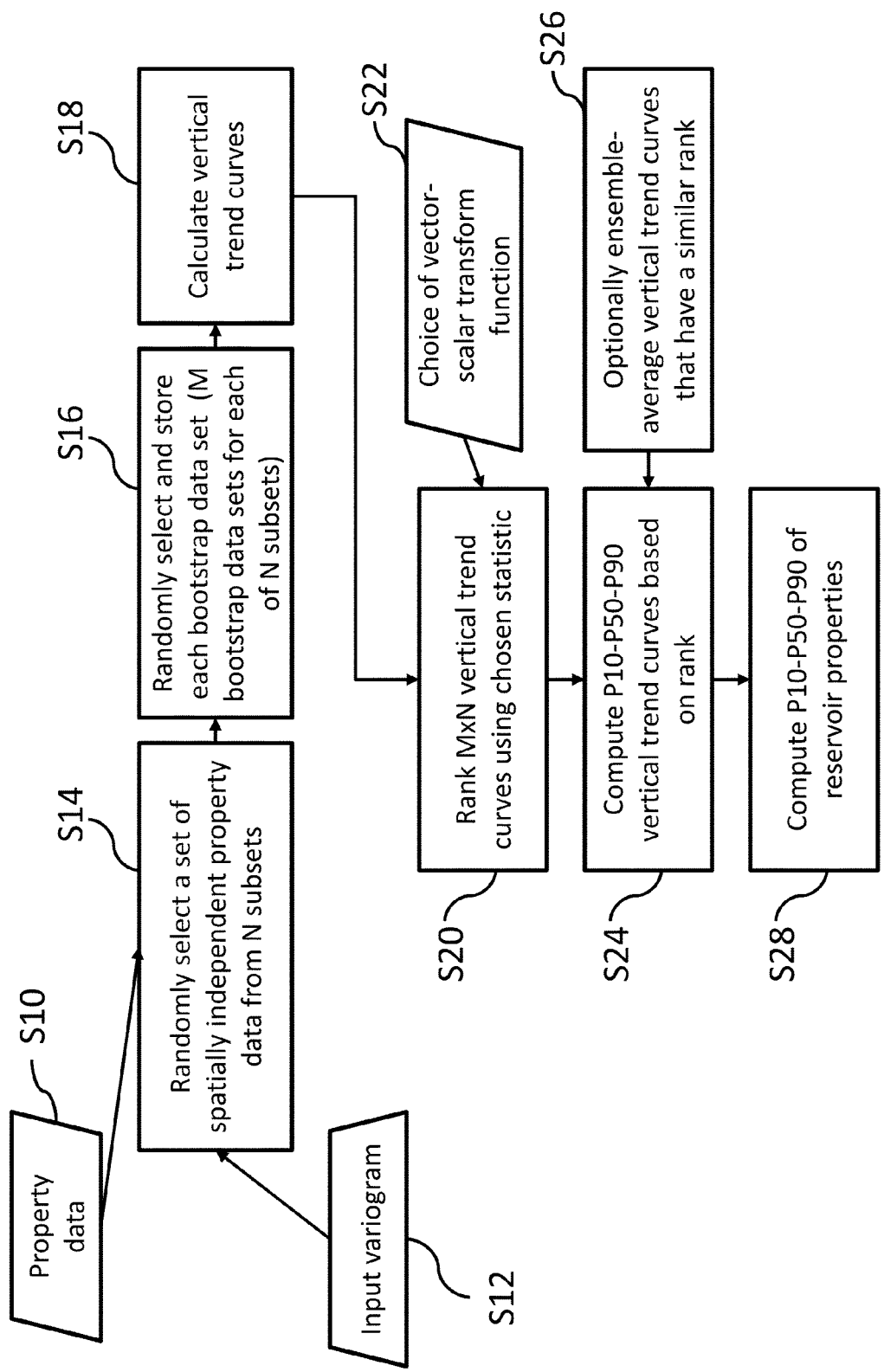
FIG. 1 is flow chart of a method of determining the uncertainty of a reservoir property vertical trend curve for reservoir sample data, according to an embodiment of the present invention.

FIG. 1 is flow chart of a method of determining the uncertainty of a vertical trend curve, according to an embodiment of the present invention. The method determines the uncertainty of a vertical trend curve without requiring that the sample reservoir data are independent, the sample data comprising correlated data. In one embodiment, the method includes inputting the sample reservoir data, at S10. The reservoir data may include any one or a combination of geological, geophysical, and petrophysical data.

In one embodiment, the sample data includes values at a plurality of depths, for example, cased hole samples or already assigned samples in a grid. For example, there are situations where only a partial sampling of a population is available as there is a limited number of boreholes or a limited number of cores (e.g., extracted from the boreholes). As a result, the data collected from the samples may be correlated. As a result, uncertainty exists because the available partial sample is only a small portion of a larger volume of rock to be characterized (e.g., in an entire region) and the data within the collected sample is correlated, i.e., dependent. Even if the number of samples may be relatively large, because samples are collected from locations that are near each other, the large number of samples may be dependent and also may not be representative of the larger volume to be characterized.

In order to select a set of independent data from a sample population containing dependent or correlated data, a variogram is used. The method includes inputting a variogram, at S12. A variogram in a two-dimensional space is generally noted $2\gamma(\delta x, \delta y)$, where $2\gamma(\delta x, \delta y)$ is called the semi-variogram. The variogram is a function describing the degree of spatial dependence as a function of separation $(\delta x, \delta y)$ between two points of a spatial random field or stochastic process $Z(x,y)$. The variogram is used, at S14, to create N subsets of property data that are substantially spatially less correlated than the initial set of correlated sample data so as to apply a bootstrap process. N subsets (where N is greater than 2) are needed so as to achieve a statistically meaningful result.

A variogram can be generated from many sources. For example, a variogram can be generated by analyzing the original sample data (e.g., the sample core data) and analyzing the correlation of the sample data as a function of distance $(\delta x, \delta y)$. The variogram can also be generated from conceptual models. In the present case, however, the variogram is generated by analyzing the original sample data correlation with distance. However, as it can be appreciated other methods for generating a variogram can also be used. For example, when the sample data are relatively close they are considered to be dependent but as distance increases the dependency or correlation in the sample data decreases. In other words, the distance is scaled by a variogram. Variogram distance in one direction may not be equivalent to variogram distance in another direction. In this respect, variograms are ellipsoids in that the variation of the variogram along the east-west direction is different from the variation of the variogram along the north-south direction.

Variograms have a gamma value also called covariance. The gamma value varies from zero to one, when using normal scores. When using a normal score transform such as, for example, the standard deviation, the gamma value is equal to one when normalized by the standard deviation. Hence, it is generally assumed that if gamma values are greater than one then the sample data is considered to be independent. On the other hand, if gamma values are less than one then the sample data is dependent or correlated. The closer the gamma value to zero, the more the sample data is dependent or correlated.

The gamma value threshold can be selected by a user according to the sample data. If the sample data is highly correlated, for example, then selecting a gamma value threshold greater than one would eliminate a great number of data points which would render a bootstrap process on the sample data not useful. On the other hand selecting a gamma value threshold close to zero would leave most the correlated sample data which would also render a bootstrap operation on correlated sample data less useful. Therefore, the gamma value threshold is selected to achieve a compromise so as not to filter out most of the sample data but at the same time select sample data that is not highly correlated so as to obtain a meaningful bootstrap result. Therefore, the gamma value can be selected from the range between zero and approximately one. However, in order to achieve a good compromise, a gamma value between about 0.3 to about 1 can be selected. In an embodiment, a gamma value of approximately 0.5 is selected as the threshold. Hence, sample data that have a gamma value of less than approximately 0.5 is filtered out while sample data having a gamma value greater than approximately 0.5 (e.g., between approximately 0.5 and 1.0) is used.

After defining the N subset of substantially spatially less correlated or independent property data using the variogram, at S12, the method randomly selects one set of spatially independent property data, at S14. A bootstrap process can be applied to each of the N subsets of spatially independent data, at S16.

A bootstrap is a name generically applied to statistical resampling schemes that allow uncertainty in the data to be assessed from the data themselves. Bootstrap is generally useful for estimating the distribution of a statistic (e.g., mean, variance) without using normal theory (e.g. z-statistic, t-statistic). Bootstrap can be used when there is no analytical form or normal theory to help estimate the distribution of the statistics of interest because the bootstrap method can apply to most random quantities, for example, the ratio of variance and mean. There are various methods of performing a bootstrap such as by using case resampling including resampling with the Monte Carlo algorithm, parametric bootstrap, resampling residuals, Gaussian process regression bootstrap, etc.

In a resampling approach, for example, given n independent observations where i=1, ..., n and a calculated statistic S, for example the mean, the uncertainty in the calculated statistic S (e.g., mean) can be determined using a resampling bootstrap approach. In this case, $n_b$ values of $z_{bj}$, j=1, ..., $n_b$ (where $n_b$ is the number of bootstrap values which is equal to the given number n of independent observations) are drawn from the original data with replacement to obtain a bootstrap resample. A bootstrap statistic $S_b$ (e.g., new mean) is then calculated from the bootstrap resample. This procedure is repeated a plurality of times (M times) to build a distribution of uncertainty in S (e.g., mean).

Returning to the present method, the method randomly selects with repetition (M times) the data in each of the N subsets, at S16. In other words, M bootstrap sets are drawn for each subset in the N subsets of spatially independent property data. Hence, M bootstraps are performed on the N subsets of the property data in which the samples of the subsets property data are substantially less spatially dependent than the original sample data. The method includes iterating the bootstrap process M×N times until all data in each of the N subsets is processed.

The method further includes calculating vertical trend curves for each of the M×N bootstrap data sets at S18, storing the vertical trend curves as M×N model vectors and ranking the M×N model vectors using a selected statistic, at S20. One skilled in the art will recognize that the step of calculating vertical trend curves need not wait until all of the M×N bootstrap data sets have been generated; the vertical trend curves may be calculated, for example, for each bootstrap data set as it is generated or at intervals during the process of creating the N subsets of data and M×N bootstrap data sets.

There are various procedures for ranking the M×N vertical trend curves or model vectors. For example, the vectors can be ranked by using a vector-scalar transform function. Therefore, the method includes inputting a selected vector-scalar transform function, at S22. The vector-scalar function takes a vector as an input and outputs a scalar value of the vector. Examples of vector-scalar transforms include calculating the P10 of the vertical trend curve, the P50 of the vertical trend curve, the P90 of the vertical trend curve, the mean of the vertical trend curves, or the standard deviation of the vertical trend curve, etc. Applying the vector-scalar transform on the vertical trend curves obtains a scalar value for each vertical trend curve. By using the obtained scalar value from the vector-scalar transform, the vertical trend curves or vectors can be sorted into a list of scalar values each of which is associated with the vertical trend curve from which it was calculated. The scalar values are then ranked, for example, in ascending or descending order.

For example, if the vector-scalar transform is the mean function, then the vertical trend curves can be ranked from low mean to high mean. The mean of the vertical trend curve may impact the volume of a reservoir. The reservoir depends on the mean of the components that go into oil in place. Oil in place is a multiplication of various properties. Standard deviation is another vector-scalar transform that is also useful in evaluating the volume of recoverable reservoir. For example, when oil and water flow through a rock formation, the standard deviation of rock formation porosity and permeability indicates a spread of the variability that creates heterogeneity in the rock formation and consequently may lower the recovery factor.

The M×N vertical trend curves correspond to sorted list of property values at successive depths. In order to identify which of the vertical trend curves is representative of the 10th, 50th or 90th percentile values, the vertical trend curves are ranked. For example, if the mean value statistic is chosen, the vertical trend curves with the P10, P50 and P90 means are computed based on the rank, at S24. Optionally, an ensemble average is applied to vertical trend curves that have a similar ranking, or that are ranked within a desired range or ensemble averaging percentage (EAP), at S26. For example, an ensemble average of several or a portion of the vertical trend curves all of which rank near P10 (e.g., within an EAP of 5%) can be used instead of just the single vertical trend curve that falls exactly at P10. Similarly, an ensemble average of several vertical trend curves all of which rank near P50 (e.g., within an EAP of 5%) can be used instead of just the single vertical trend curve that falls exactly at P50. Similarly, an ensemble average of several vertical trend curves all of which rank near P90 can be used instead of just the single vertical trend curve that falls exactly at P90 (e.g., within an EAP of 5%). Ensemble averaging creates a smoother result. The method then outputs a P10, P50 and P90 vertical trend curves, at S28. Vertical trend curves are used as input constraints to geostatistical property modeling. The P10, P50 and P90 vertical trend curves can be used to build three different model scenarios to capture property uncertainty.

Figure 2:
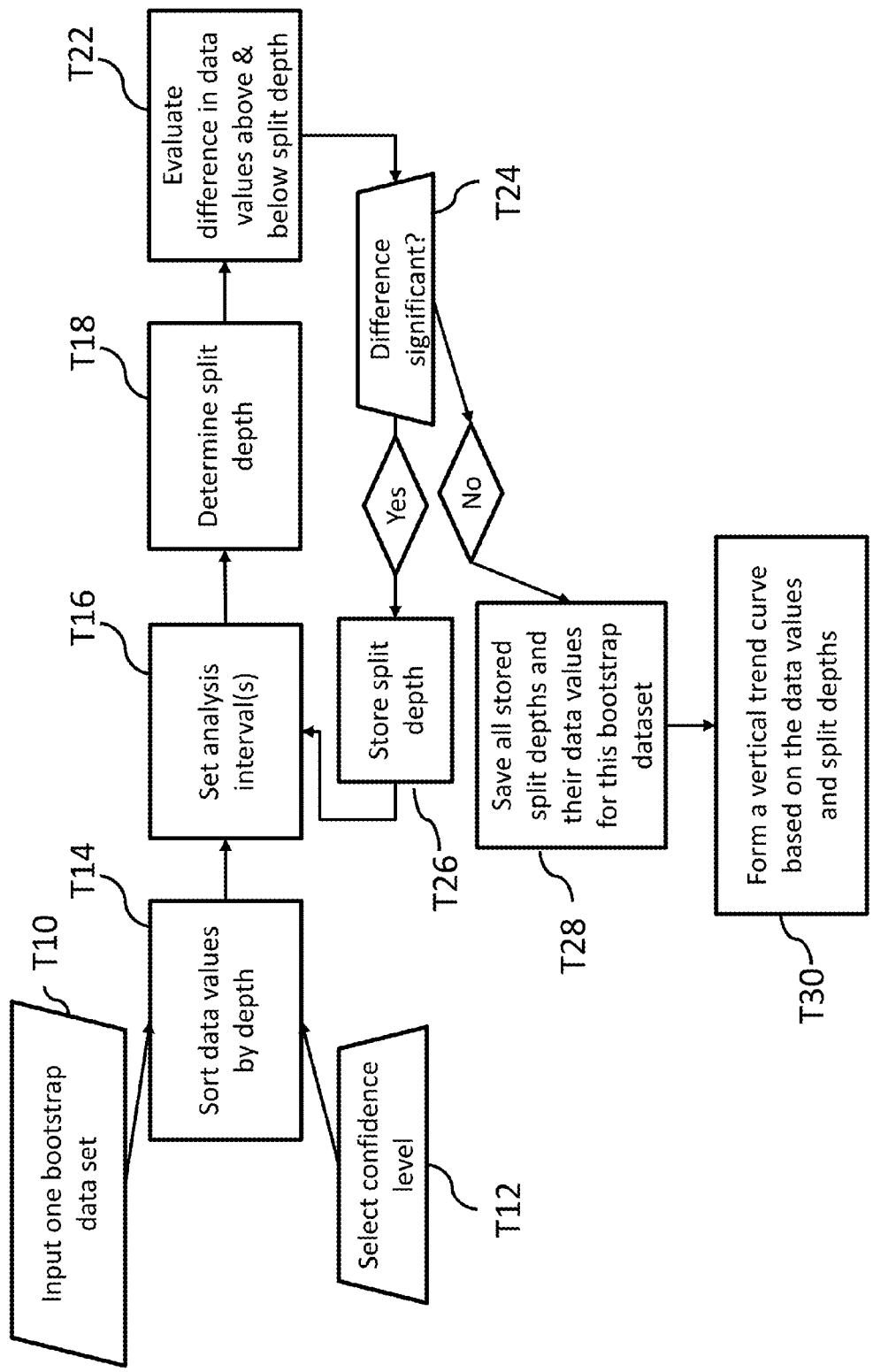
FIG. 2 is a flow chart of a method for calculating vertical trend curves.

FIG. 2 is a flow chart of a method for calculating the vertical trend curves for each of the M×N bootstrap data sets. One bootstrap data set is received at T10. At T12, a confidence level is selected. In one embodiment, this confidence level may be a randomly selected value between a user-specified minimum and maximum. Note that this confidence level may be selected at any point prior to its use at T22; the order indicated in this embodiment is not intended to be limiting.

At T14, the data values in the one bootstrap data set are sorted by depth. The initial analysis interval set at T16 includes all depths in the sorted data. Within the analysis interval, a split depth is determined at T18. The split depth is determined such that the difference between data values above the split depth and data values below the split depth is maximized. This difference may be calculated by taking the absolute value of the mean of the values above the split depth subtracted from the values below the split depth.

The difference is evaluated at T22 based on the confidence level from T12. If the difference is statistically significant, a decision is made at T24 whether to repeat the analysis for new depth intervals. Any statistical method capable of determining if two set of data have significantly different means can be used as long as it is corrected for small sample sizes. For example, an embodiment might use the Mann-Whitney U test, which is known to those skilled in the art.

If the difference is significant, the determined split depth is stored at T26. New analysis intervals are selected above and below the split depth just stored, but not extending beyond any other stored split depths. New split depths are determined in each new analysis interval at T18, new differences are evaluated at T22, and new decisions are made at T24 until there are no statistically significant differences in any of the analysis intervals and a plurality of split depths have been stored.

When there are no more split depths that produce statistically significant differences, all of the stored split depths and the data values at those depths are saved at T28. These depths and data values are used to form a vertical trend curve at T30. There may be more than one data value at each split depth; in this case, the data values may be averaged or the mean value may be used. The process of forming the vertical trend curve may be done, for example, by a single best-fit line, straight lines at the mean value between the split depths, splines between the split depths, or a combination of these. These examples are not meant to be limiting.

The method shown in FIG. 2 is repeated M×N times for each of the M×N bootstrap data sets, resulting in M×N vertical trend curves. These vertical trend curves are used in the method illustrated by FIG. 1 beginning at S20.

Figure 3:
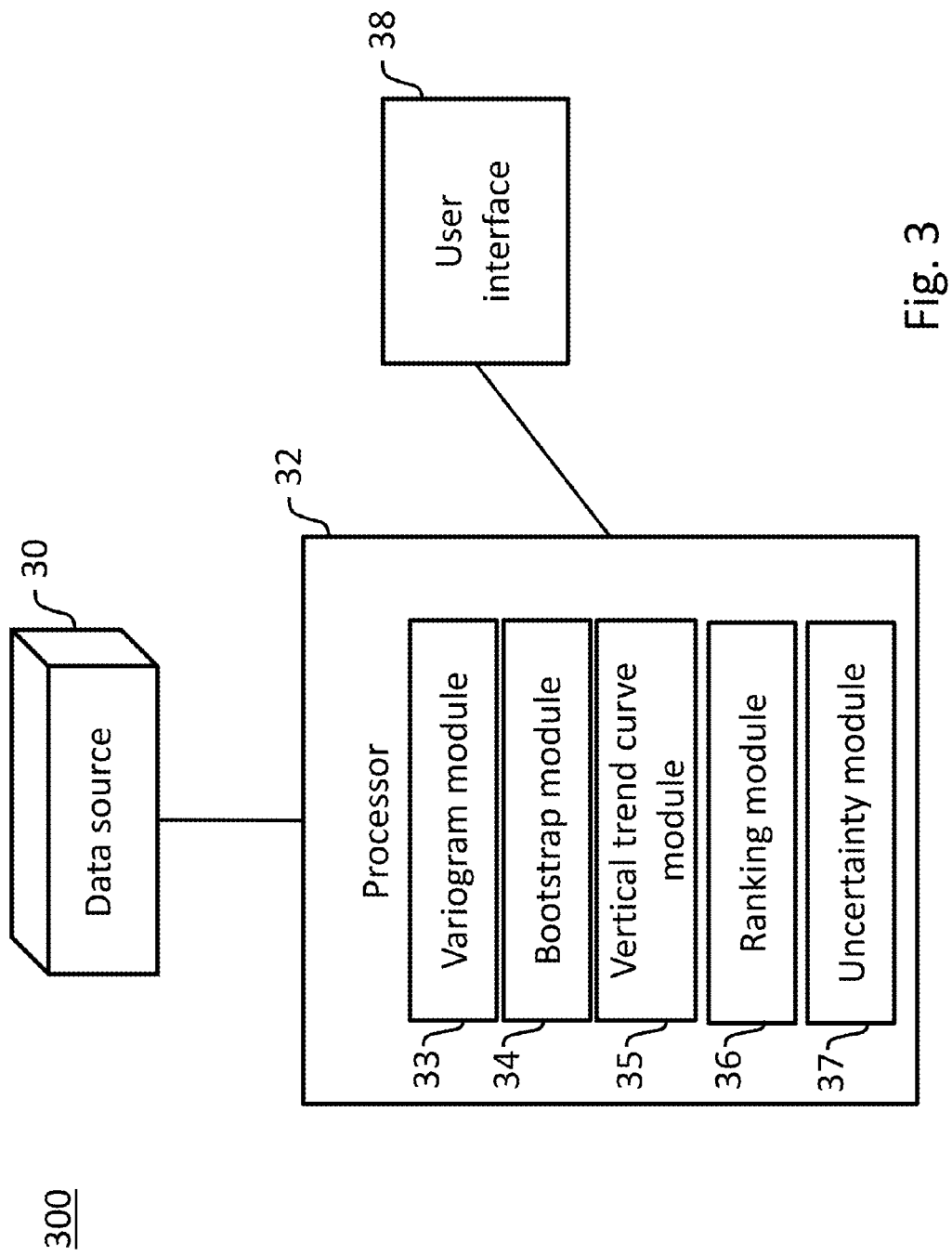
FIG. 3 is a schematic representation of a system for performing a method of the present invention.

FIG. 3 illustrates a system 300 for performing a method for determining uncertainty of a vertical trend curve. A non-transitory data source 30 contains sample reservoir data which is provided to the processor 32. Processor 32 is also in communication with user interface 38. The processor 32 is configured to execute modules, accept user input from the user interface 38, and display products of the executed modules on the user interface 38. The modules that may be executed by the processor 32 include a variogram module 33, a bootstrap module 34, a vertical curve module 35, a ranking module 36 and an uncertainty module 37 which together perform the method described previously and illustrated in FIGS. 1 and 2.

Figure 4:
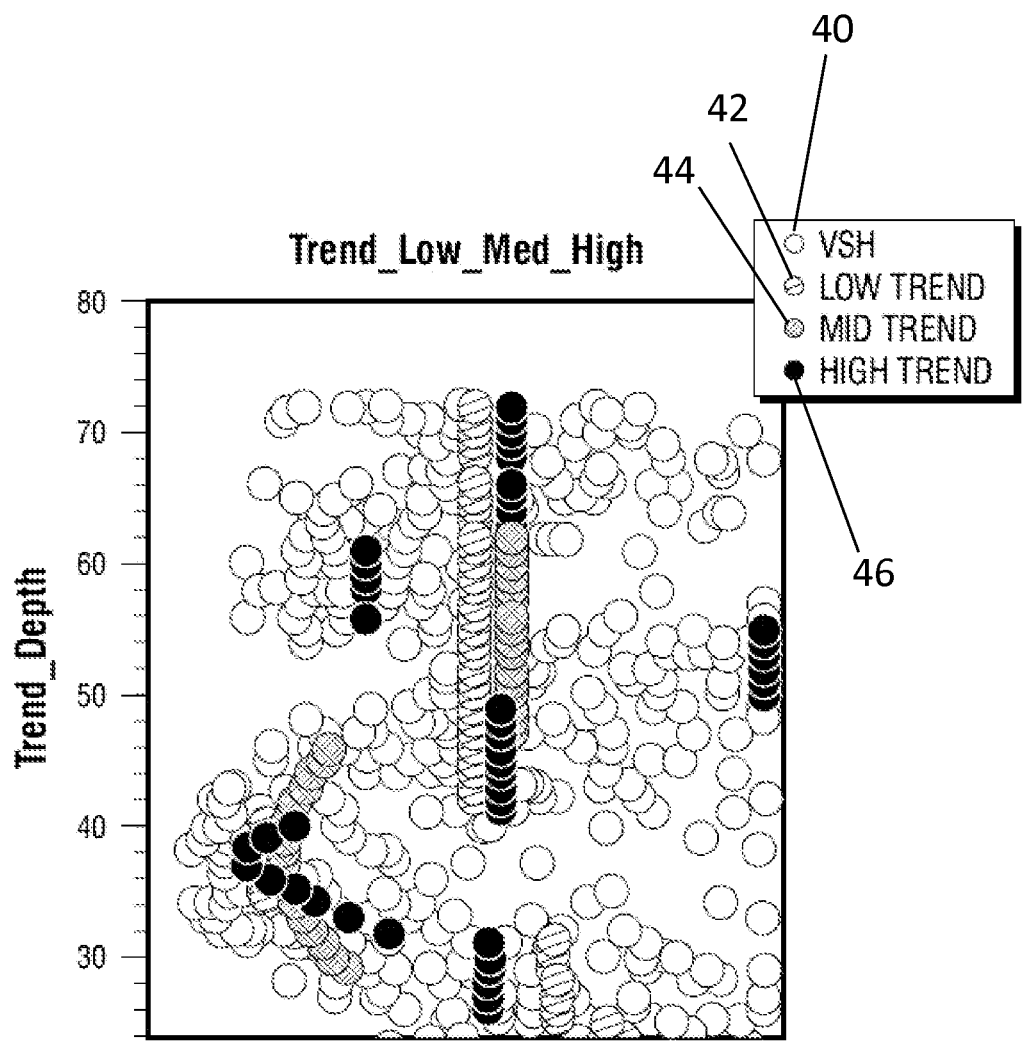
FIG. 4 is an example of ranked vertical trend curves produced by an embodiment of the present invention.

An intermediate result of performing an embodiment of the method of FIG. 1 can be seen in FIG. 4, which shows the ranked vertical trend curves for a single bootstrap data set. Here, the shale volume data (VSH) indicated by white circles 40 is the sample reservoir data set used as input for the method. The method of FIG. 1 was performed using the standard deviation for ranking purposes. The low ranked trend 42 is indicated by lightly hatched circles. The mid-ranked trend 44 is indicated by gray circles and the high ranked trend 46 is indicated by black circles. The low, mid and high cases in this figure have low, mid and high ranking based on standard deviation. Since the standard deviation was used for ranking purposes, the high trend case has a higher standard deviation than the low trend case. This example is not meant to be limiting; one skilled in the art will recognize that there are many other types of data and choices for performing the method of the present invention.

In some embodiments, programs for performing methods in accordance with embodiments of the invention can be embodied as program products in a computer such as a personal computer or server or in a distributed computing environment comprising a plurality of computers. The computer may include, for example, a desktop computer, a laptop computer, a handheld computing device such as a PDA, etc. The computer program products may include a computer readable medium or storage medium or media having instructions stored thereon used to program a computer to perform the methods described above. Examples of suitable storage medium or media include any type of disk including floppy disks, optical disks, DVDs, CD ROMs, magnetic optical disks, RAMs, EPROMs, EEPROMs, magnetic or optical cards, hard disk, flash card (e.g., a USB flash card), PCMCIA memory card, smart card, or other media. Alternatively, a portion or the whole computer program product can be downloaded from a remote computer or server via a network such as the internet, an ATM network, a wide area network (WAN) or a local area network.

Stored on one or more of the computer readable media, the program may include software for controlling both the hardware of a general purpose or specialized computer or processor. The software also enables the computer or processor to interact with a user via output devices such as a graphical user interface, head mounted display (HMD), etc. The software may also include, but is not limited to, device drivers, operating systems and user applications.

Alternatively, instead or in addition to implementing the methods described above as computer program product(s) (e.g., as software products) embodied in a computer, the method described above can be implemented as hardware in which for example an application specific integrated circuit (ASIC) can be designed to implement the method or methods of the present invention.

Although the various steps of the method are described in the above paragraphs as occurring in a certain order, the present application is not bound by the order in which the various steps occur. In fact, in alternative embodiments, the various steps can be executed in an order different from the order described above.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

Furthermore, since numerous modifications and changes will readily occur to those of skill in the art, it is not desired to limit the invention to the exact construction and operation described herein. Accordingly, all suitable modifications and equivalents should be considered as falling within the spirit and scope of the invention.

What is claimed is:

1. A method, implemented on a computer, for calculating vertical trend curve uncertainty of spatially correlated reservoir data, comprising:
   inputting, into the computer, a sample reservoir data comprising correlated data from a reservoir volume of interest;
   applying, using the computer, a variogram to the sample reservoir data to select a plurality of subsets of data, the subsets of data being substantially less correlated than the sample reservoir data;
   applying, using the computer, a bootstrap process on each of the plurality of subsets of data to obtain a plurality of bootstrap data sets from each of the plurality of subsets of data;
   calculating vertical trend curves for each of the obtained plurality of bootstrap data sets;
   ranking the vertical trend curves by using a selected statistical parameter to obtain ranked vertical trend curves;
   characterizing a vertical trend curve uncertainty based on the ranked vertical trend curves; and
   using the vertical trend curve uncertainty to characterize the reservoir volume of interest and estimate one or more properties of the reservoir volume of interest, the properties comprising at least one of porosity volume, original oil in place, net rock volume, or combinations thereof.

2. The method according to claim 1, wherein characterizing the uncertainty based on the ranked data distributions comprises calculating a P10, a P50, or a P90, or any combination of two or more thereof, of the ranked vertical trend curves.

3. The method according to claim 1, wherein applying the bootstrap process comprises applying a resampling bootstrap process on each of the plurality of subsets of data.

4. The method according to claim 3, wherein applying the resampling process comprises resampling with a Monte Carlo algorithm each of the plurality of subsets of data.

5. The method according to claim 1, wherein the calculating vertical trend curves for each of the obtained plurality of bootstrap data sets comprises:
   selecting a current bootstrap data set from the obtained plurality of bootstrap data sets, wherein the current bootstrap data set includes data values for a plurality of depths;
   selecting a confidence level;
   sorting the data values from the current bootstrap data set by depth;
   setting an analysis interval to include all depths in the current bootstrap data set;
   determining a split depth within the analysis interval that maximizes a difference in the data values above the split depth and below the split depth;
   evaluating whether the difference is statistically significant at the confidence level;
   storing, if the difference is statistically significant, the split depth as a stored split depth and setting a new upper analysis interval above the stored split depth and a new lower analysis interval below the stored split depth;
   repeating the determining, evaluating, storing, and setting the new upper and lower analysis intervals to obtain a plurality of stored split depths until the difference is not statistically significant;
   calculating an average value of the data values at each of the stored split depths; and
   forming a vertical trend curve using the average value at the stored split depths.

6. The method according to claim 5, wherein the vertical trend curve is a spline curve between any of the stored split depths.

7. The method according to claim 1, wherein applying the variogram comprises selecting a gamma value of the variogram according to the sample reservoir data.

8. The method according to claim 7, wherein selecting the gamma value comprises selecting a gamma value in a range between 0.3 and 1.

9. The method according to claim 8, wherein selecting the gamma value comprises selecting a gamma value greater than 0.5.

10. The method according to claim 1, wherein ranking the vertical trend curves by using the selected statistical parameter comprises applying a vector-scalar transform to the vertical trend curves to obtain scalar values, each scalar value being associated with a vertical trend curve, and ranking the vertical trend curves according to the obtained scalar values.

11. The method according to claim 10, wherein applying the vector-scalar transform comprises a mean function or a standard deviation function.

12. The method according to claim 11, further comprising applying an ensemble averaging to a portion of the vertical trend curves that are ranked within a desired ranking ensemble averaging percentage.

13. The method according to claim 11, further comprising applying an ensemble averaging to a first portion of the vertical trend curves that are ranked within a first desired ranking ensemble averaging percentage of a 10 percentile, applying an ensemble averaging to a second portion of the vertical trend curves that are ranked within a second desired ranking ensemble averaging percentage of a 50 percentile, and applying an ensemble averaging to a third portion of the vertical trend curves that are ranked within a third desired ranking ensemble averaging percentage of a 90 percentile.

14. A non-transitory computer readable medium having instructions stored thereon that when executed by a computer performs a method comprising:
  applying, using the computer, a variogram to the sample reservoir data to select a plurality of subsets of data, the subjects of data being substantially less correlated than the sample reservoir data;
  applying, using the computer, a bootstrap process on each of the plurality of subjects of data to obtain a plurality of bootstrap data sets from each of the plurality of subsets of data;
  calculating a vertical trend curves for each of the plurality of bootstrap data sets;
  ranking the vertical trend curves by using a selected statistical parameter to obtain trend ranked vertical trend curves;
  characterizing a vertical trend curve uncertainty based on the ranked vertical trend curves; and
  using the vertical trend curve uncertainty to characterize the reservoir volume of interest and estimate one or more properties of the reservoir volume of interest, the properties comprising at least one of porosity volume, original oil in place, net rock volume, or combinations thereof.

15. A computer system for calculating property vertical trend curve uncertainty of spatially correlated reservoir data, comprising:
  a storage device configured to store a sample reservoir data comprising correlated data from a reservoir volume of interest;
  a processor configured to output a graphical user interface, the graphical user interface comprising a plurality of fields for inputting parameters including a variogram, wherein the processor is configured to:
  apply the variogram to the sample reservoir data to select a plurality of subsets of data, the subsets of data being substantially less correlated than the sample reservoir data;
  apply a bootstrap process on each of the plurality of subsets of data to obtain a plurality of bootstrap data sets from each of the plurality of subsets of data;
  calculate vertical trend curves for each of the obtained plurality of bootstrap data sets;
  rank the vertical trend curves by using a selected statistical parameter to obtain ranked vertical trend curves;
  characterize a vertical trend curve uncertainty based on the ranked vertical trend curves; and
  using the vertical trend curve uncertainty to characterize the reservoir volume of interest and estimate one or more properties of the reservoir volume of interest, the properties comprising at least one of porosity volume, original oil in place, net rock volume, or combinations thereof.

16. The computer system according to claim 15, wherein the processor is configured to apply a resampling bootstrap process on each of the plurality of subsets of data.

17. The computer system according to claim 15, wherein the processor is configured to characterize the uncertainty by calculating a P10, a P50, or a P90, or any combination of two or more thereof, of the ranked vertical trend curves.

18. The computer system according to claim 15, wherein the processor is configured to apply a vector-scalar transform to the vertical trend curves to obtain scalar values, each scalar value being associated with a vertical trend curve, and rank the vertical trend curves according to the obtained scalar values.

19. The computer system according to claim 18, wherein the vector-scalar transform comprises a mean function or a standard deviation function.
  apply a bootstrap process on each of the plurality of subsets of data to obtain a plurality of bootstrap data sets from each of the plurality of subsets of data;
  calculate vertical trend curves for each of the obtained plurality of bootstrap data sets;
  rank the vertical trend curves by using a selected statistical parameter to obtain ranked vertical trend curves;
  characterize a vertical trend curve uncertainty based on the ranked vertical trend curves;
  and using the vertical trend curve uncertainty to characterize the reservoir volume of interest and estimate one or more properties of the reservoir volume of interest, the properties comprising at least one of porosity volume, original oil in place, net rock volume, or combinations thereof.

20. The computer system according to claim 15, wherein the graphical user interface comprises a plurality of fields for inputting parameters including a variogram gamma value.

21. The computer system according to claim 20, wherein the gamma value is in a range between 0.3 and 1.

22. The computer system according to claim 20, wherein the graphical user interface comprises a plurality of fields for inputting parameters including a number of the plurality of subsets.

23. The computer system according to claim 22, wherein the graphical user interface comprises a plurality of fields for inputting parameters including a number of bootstrap runs that are implemented for each subset in the number of the plurality of subsets to obtain the plurality of bootstrap data sets.

24. The computer system according to claim 23, wherein the graphical user interface comprises a plurality of fields for inputting parameters including an ensemble averaging percentage such that bootstrap data sets in the plurality of bootstrap data sets that are ranked near each other within the specified ensemble averaging percentage are averaged together.

25. A method, implemented on a computer, for calculating a vertical trend curve from reservoir data from a reservoir volume of interest, the method comprising:
  receiving, via a computer, a reservoir data set including data values at a plurality of depths;
  selecting a confidence level;
  sorting the data values by depth;

setting an analysis interval to include all depths in the data set;

determining, via a computer, a split depth within the analysis interval that maximizes a difference in the data values above the split depth and below the split depth;

evaluating, via a computer, whether the difference is statistically significant at the confidence level;

storing, if the difference is statistically significant, the split depth as a stored split depth and setting a new upper analysis interval above the stored split depth and a new lower analysis interval below the stored split depth;

repeating the determining, evaluating, storing, and setting the new upper and lower analysis intervals to obtain a plurality of stored split depths until the difference is not statistically significant;

calculating, via a computer, an average value of the data values at each of the stored split depths; and forming, via a computer, the vertical trend curve using the average value at the stored split depths; and using the vertical trend curve to characterize the reservoir volume of interest and estimate one or more properties of the reservoir volume of interest, the properties comprising at least one of porosity volume, original oil in place, net rock volume, or combinations thereof.

\* \* \* \* \*